(12) United States Patent
Isom et al.

(10) Patent No.: US 8,983,712 B2
(45) Date of Patent: Mar. 17, 2015

(54) METHOD AND SYSTEM FOR DETECTING PUSHROD FAULTS

(75) Inventors: Joshua D. Isom, South Windsor, CT (US); Mark W. Davis, Southbury, CT (US); William A. Welsh, North Haven, CT (US); Brian Edward Morris, Shelton, CT (US); James Peter Cycon, Media, PA (US)

(73) Assignee: Sikorsky Aircraft Corporation, Stratford, CT (US)

(*) Notice: Subject to any disclaimer, the term of this patent is extended or adjusted under 35 U.S.C. 154(b) by 62 days.

(21) Appl. No.: 13/805,719

(22) PCT Filed: Jun. 22, 2011

(86) PCT No.: PCT/US2011/041374
§ 371 (c)(1),
(2), (4) Date: May 15, 2013

(87) PCT Pub. No.: WO2011/163316
PCT Pub. Date: Dec. 29, 2011

(65) Prior Publication Data
US 2013/0274989 A1    Oct. 17, 2013

Related U.S. Application Data

(60) Provisional application No. 61/358,501, filed on Jun. 25, 2010.

(51) Int. Cl.
*B64D 45/00*    (2006.01)
*B64F 5/00*    (2006.01)
*G05B 23/02*    (2006.01)
*B64F 1/22*    (2006.01)

(52) U.S. Cl.
CPC ........ *B64D 45/00* (2013.01); *B64D 2045/0085* (2013.01); *B64F 5/0045* (2013.01); *G05B 23/0243* (2013.01)
USPC .......................... 701/31.4; 701/3; 244/17.23

(58) Field of Classification Search
USPC ........... 701/31.4, 38, 9, 10; 244/17.23; 416/1, 416/33, 61
See application file for complete search history.

(56) References Cited

U.S. PATENT DOCUMENTS

| | | | |
|---|---|---|---|
| 5,210,704 A | 5/1993 | Husseiny | |
| 5,383,133 A | 1/1995 | Staple | |
| 6,229,898 B1 * | 5/2001 | Goodman | 381/71.4 |
| 6,693,548 B2 * | 2/2004 | Boyce et al. | 340/657 |
| 7,719,416 B2 | 5/2010 | Arms et al. | |
| 8,639,458 B2 * | 1/2014 | Bechhoefer et al. | 702/56 |
| 2010/0003133 A1 * | 1/2010 | Welsh | 416/1 |
| 2010/0219987 A1 * | 9/2010 | Isom et al. | 340/946 |

OTHER PUBLICATIONS

Cabell et al., "Neural Network Modelling of Oscillatory Loads and Fatigue Damage Estimation of Helicopter Components", Journal of Sound and Vibration (1998) 209(2), 329-342, 14 pages.

(Continued)

*Primary Examiner* — Tan Q Nguyen
(74) *Attorney, Agent, or Firm* — Cantor Colburn LLP

(57) ABSTRACT

A system for monitoring for pushrod faults in an aircraft includes a pushrod; a sensor (36) mounted on the pushrod (34), the sensor (36) wirelessly transmitting measured pushrod load data; a receiver (44) receiving the measured pushrod load data; a model (42) receiving flight data and generating a modeled pushrod load profile; and a fault detector (46) comparing measured pushrod load data to the modeled pushrod load profile to detect a pushrod fault.

12 Claims, 4 Drawing Sheets

(56) References Cited

OTHER PUBLICATIONS

PCT International Search Report and Written Opinion of the International Searching Authority for International Application No. PCT/US2011/041374, Feb. 21, 2012, 5 pages.

PCT International Preliminary Report on Patentability and Written Opinion of the International Searching Authority for International Application No. PCT/US2011/041374, Jan. 10, 2013, 6 pages.

* cited by examiner

METHOD AND SYSTEM FOR DETECTING PUSHROD FAULTS

BACKGROUND OF THE INVENTION

The subject matter disclosed herein relates generally to health monitoring, and more particularly to detection of pushrod faults.

Helicopter rotors use pushrods to control the main rotor. The pushrods control various flight characteristics of the helicopter, such as collective rotor control and cyclic rotor control. Pushrods experience loads during flight, and over time, require service and/or replacement. Pushrod bearings on the ends of the pushrods require routine inspection. In certain designs, elastomeric bearings at the ends of a pushrod are typically visibly inspected to determine if the bearings need to be replaced. Such visual inspections are time-consuming and burdensome on service personnel. A system for automatically predicting when pushrod faults are imminent would be well received in the art.

BRIEF DESCRIPTION OF THE INVENTION

According to one aspect of the invention a system for monitoring for pushrod faults in an aircraft includes a pushrod; a sensor mounted on the pushrod, the sensor wirelessly transmitting measured pushrod load data; a receiver receiving the measured pushrod load data; a model receiving flight data and generating a modeled pushrod load profile; and a fault detector comparing the measured pushrod load data to the modeled pushrod load profile to detect a pushrod fault.

According to another aspect of the invention, a method for monitoring for pushrod faults in an aircraft includes receiving measured pushrod load data from a wireless sensor mounted on a pushrod; executing a model, the model receiving flight data and generating a modeled pushrod load profile; and comparing the measured pushrod load data to the modeled pushrod load profile to detect a pushrod fault.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
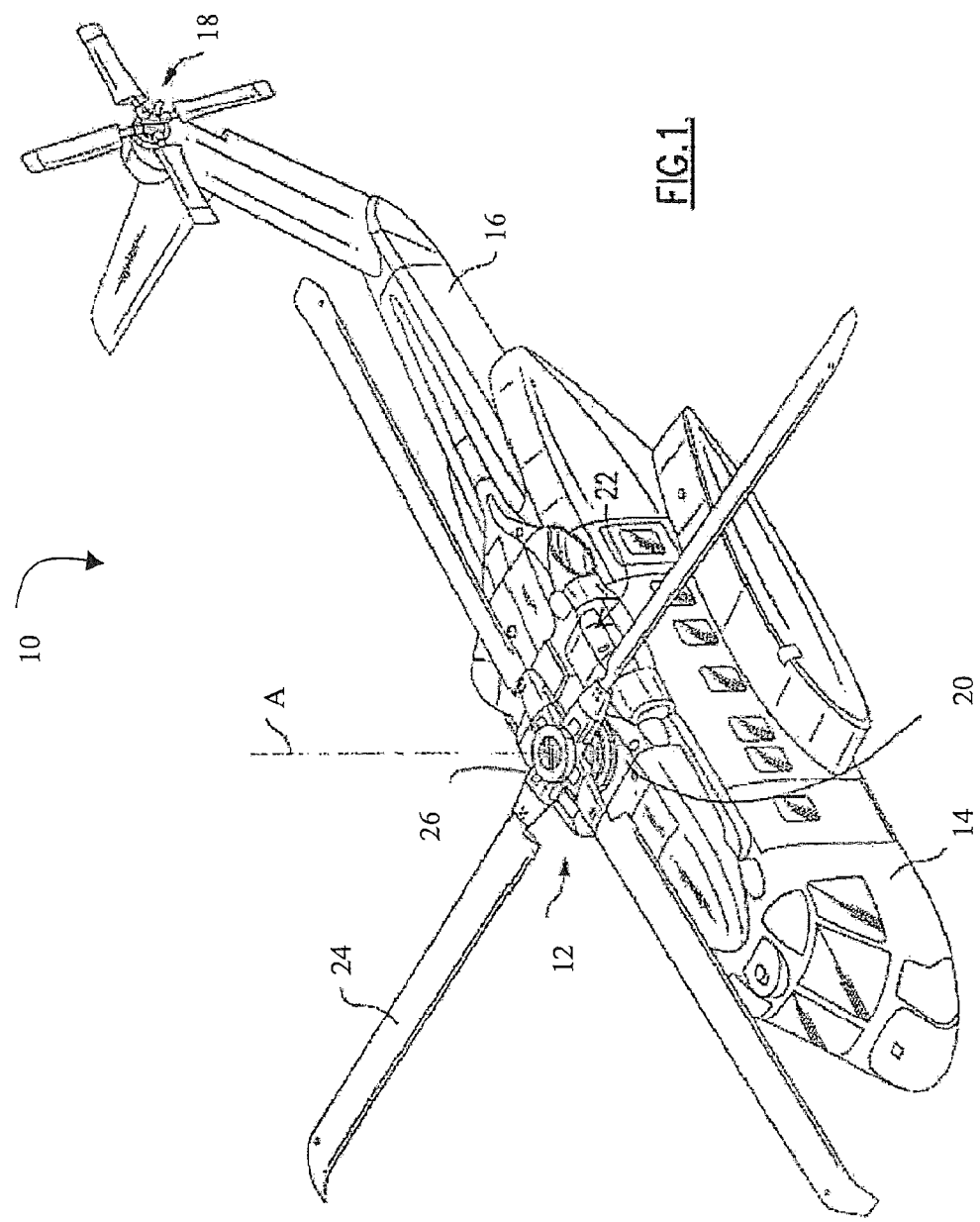
FIG. 1 illustrates an exemplary vertical takeoff and landing (VTOL) rotary-wing aircraft.

FIG. 1 illustrates an exemplary vertical takeoff and landing (VTOL) rotary-wing aircraft 10. The aircraft 10 in the disclosed, non-limiting embodiment includes a main rotor system 12 supported by an airframe 14 having an extending tail 16 which mounts an anti-torque system 18. The main rotor system 12 is driven about an axis of rotation A through a main rotor gearbox (MGB) 20 by a multi-engine powerplant system 22. The multi-engine powerplant system 22 generates the power available for flight operations and couples such power to the main rotor system 12 and the anti-torque system 18 through the MGB 20. The main rotor system 12 includes multiple rotor blades 24 mounted to a rotor hub 26 driven by a main rotor shaft. Although a particular helicopter configuration is illustrated and described in the disclosed embodiment, other configurations and/or machines, which have a rotating frame of reference and a fixed frame of reference will also benefit herefrom.

Figure 2:
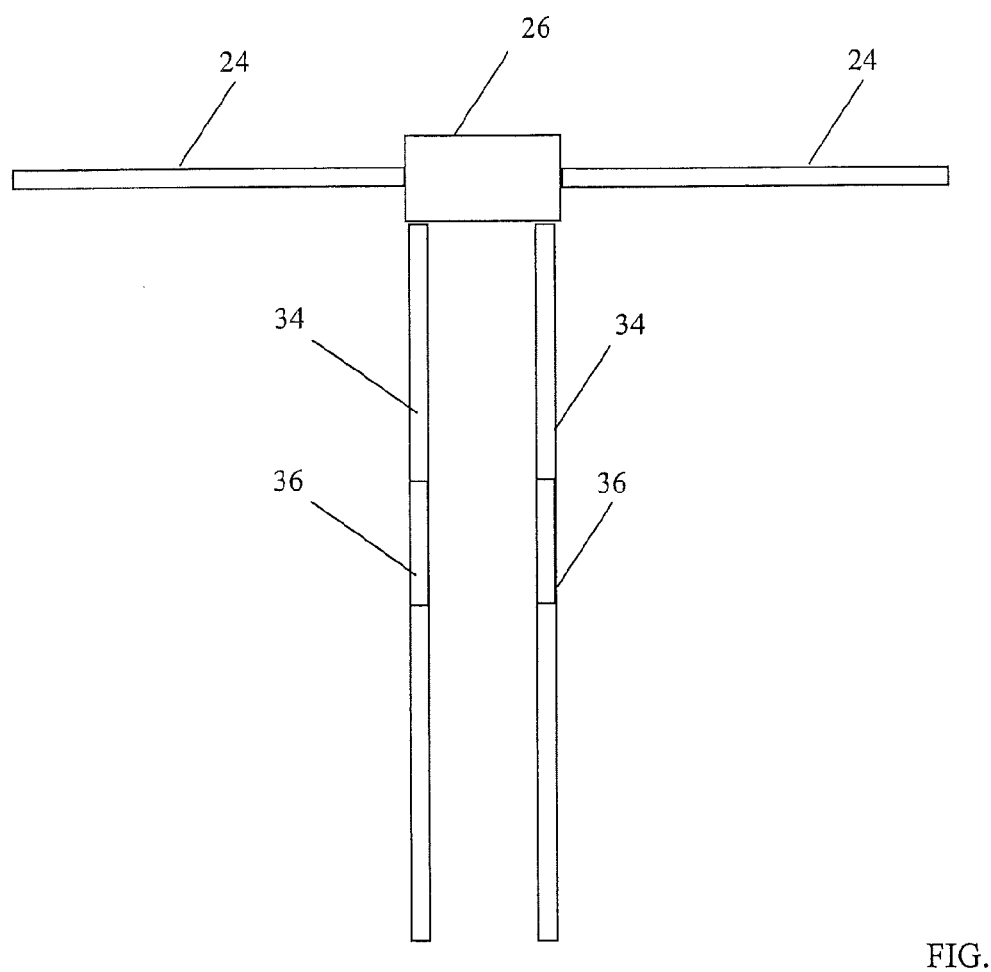
FIG. 2 is a block diagram of a rotor hub and pushrods.

FIG. 2 depicts a rotor hub 26 for driving rotor blades 24 in a simplified block diagram. FIG. 2 also depicts pushrods 34 that apply force to the rotor hub 26 to provide collective and cyclic control to the rotor blades 24. The details of the interconnection between the pushrods 34 and the rotor hub 26 (e.g., swashplate, pitch links, bearings, etc.) are omitted for clarity.

Each pushrod 34 has a sensor 36 affixed thereto. In an exemplary embodiment, the sensor 36 is a strain gauge that transmits strain measurements wirelessly to a health and usage monitoring system (HUMS) 40 as described in further detail with reference to FIG. 3. The sensors 36 may be secured to the pushrods 34 using fasteners, adhesives or other known techniques. The sensors 36 provide measured pushrod load data. In exemplary embodiments, the sensors 36 provide measured pushrod load data multiple times (e.g., 80) per revolution of rotor hub 26.

Figure 3:
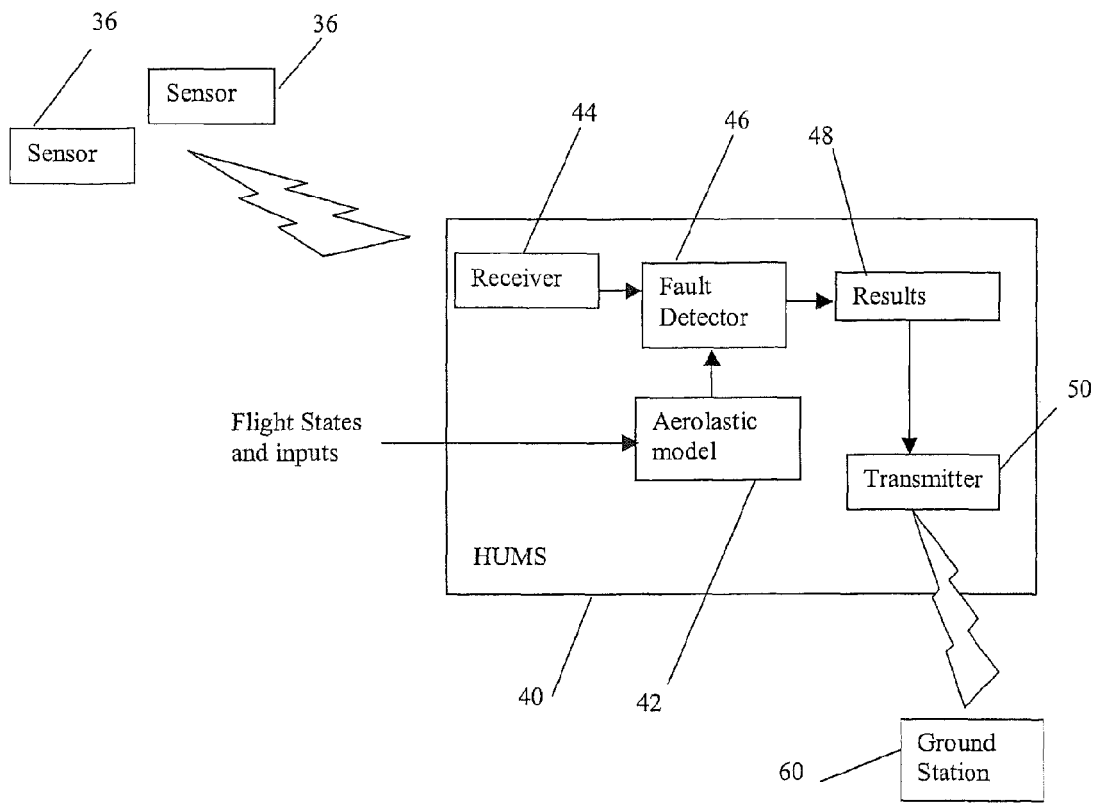
FIG. 3 depicts a system for detecting pushrod faults in exemplary embodiments.

FIG. 3 depicts a system for detecting pushrod faults in exemplary embodiments. The system includes a health and usage monitoring system (HUMS) 40. The HUMS 40 may be implemented by a multi-processor device executing a computer program to perform the processes described herein. The HUMS 40 will include conventional computer components such as RAM, hard drive, I/O ports, etc. A wireless receiver 44 receives measured pushrod load data from sensors 36. At the same time, a model 42 receives flight states and flight inputs to generate a real-time, modeled pushrod load profile for a healthy pushrod. The flight states and flight inputs may include a set of aircraft state parameters such as, for example, airspeed, torque, altitude, collective position, cyclic longitudinal position, cyclic lateral position, and vertical acceleration. Fault detector 46 compares the measured pushrod load data from the sensors 36 to the modeled pushrod load profile from model 42. As described in further detail with reference to FIG. 4, different types of comparisons can be made between the measured pushrod load data and the modeled pushrod load profile.

The results from fault detector 46 (e.g., presence or absence of a pushrod fault) are stored in a results file 48, along with other information such as the measured pushrod load data, modeled pushrod load profile, flight states and inputs, etc. The results may be provided to a transmitter 50 that can wirelessly transmit the results to a ground station 60 once the aircraft lands.

The ground station 60 may be a computer-implemented system that collects the data from the aircraft. Ground crews can review the results output by the fault detector 46 and recognize whether pushrod maintenance is needed. Further, all data from the results file 48 can be analyzed. This data may be used to determine if the model 42 is accurately predicting pushrod load profiles, allowing the model 42 to be updated as needed.

Figure 4:
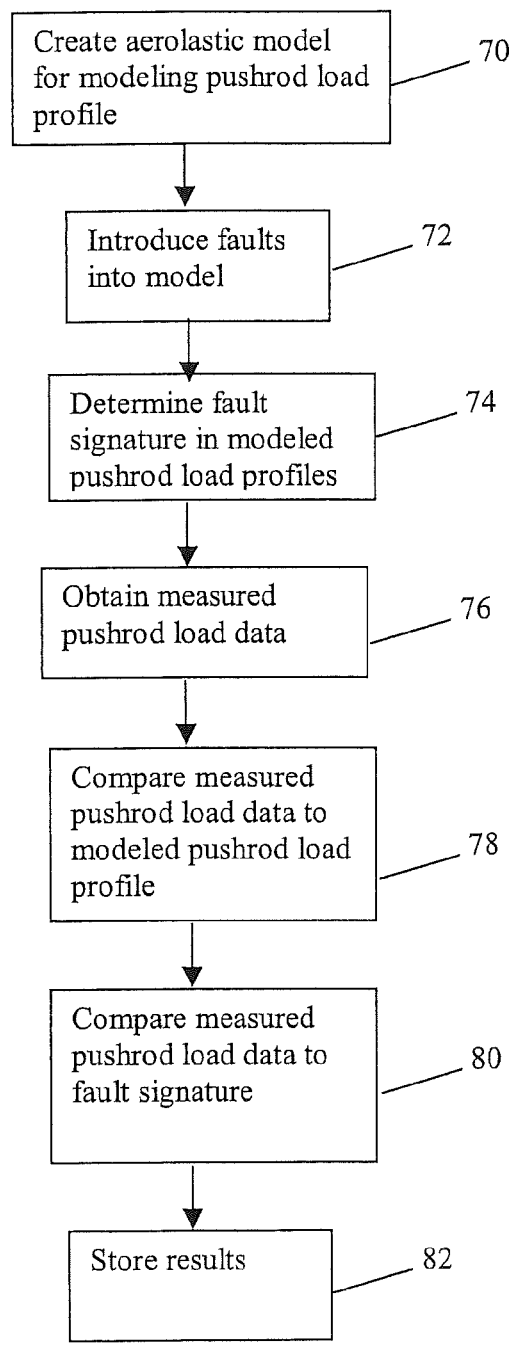
FIG. 4 is a flowchart of a method for detecting pushrod faults in exemplary embodiments.

FIG. 4 depicts a method of detecting pushrod faults in an exemplary embodiment. The method begins at step 70 where the empirical model 42 for modeling pushrod load profiles is generated. To develop the empirical model, a heavily instrumented aircraft undergoes flight test in which flight test data is recorded. The flight test data includes, for example, aircraft state parameters as well as high frequency measurements of pushrod strain. The flight test data is stored in a solid-state device on the aircraft during the flight test and then decoded and moved to a computer system for analysis and development of aerolastic model 42.

At step 72, pushrod faults are introduced into the model and the model output is recorded as a fault signature at step 74. The fault may, for example, be indicative of failure of a pushrod bearing or indicative of pushrod failure. A number of individual and collective faults may be introduced into the model to collect a set a pushrod fault signatures. As described in further detail herein, the pushrod fault signatures are used to detect faults in the physical pushrods.

Steps 70-74 are performed pre-flight. During flight of the aircraft, the measured pushrod load data is obtained at step 76. As discussed above with reference to FIG. 3, the measured pushrod load data is derived from sensors 36. At step 78, fault detector 46 compares the measured pushrod load data to the modeled pushrod load profile from model 42. If there are significant differences between the measured pushrod load data and the modeled pushrod load profile, this indicates a potential pushrod fault. In exemplary embodiments, the measured pushrod load data and the modeled pushrod load profile are compared at the $1_{st}$, $2_{nd}$, and $4_{th}$ harmonics. In general, for an n-bladed rotor system, the $1^{st}$, $2^{nd}$, and nth harmonics would be used.

Significant differences between the measured pushrod load data and the modeled pushrod load profile at these harmonics indicates a potential pushrod fault.

At step 80, the measured pushrod load data is compared to the pushrod fault signatures derived at step 74. Since the measured pushrod load data is being compared to a known fault signature, a similarity between the measured pushrod load data and the fault signature indicates a potential pushrod fault. At step 82, the results of the comparisons from steps 78 and 80 are stored in the results file 48.

Embodiments of the invention provide a highly-sensitive indication of pushrod degradation, using the redundancy resulting from the combination of real-time load estimates with real-time load measurements. Embodiments of the invention enable condition-based maintenance for the pushrods.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for monitoring for pushrod faults in an aircraft, the system comprising:
   a pushrod;
   a sensor mounted on the pushrod, the sensor wirelessly transmitting measured pushrod load data;
   a receiver receiving the measured pushrod load data;
   a model receiving flight data and generating a modeled pushrod load profile; and
   a fault detector comparing the measured pushrod load data to the modeled pushrod load profile to detect a pushrod fault.
   wherein comparing the measured pushrod load data to the modeled pushrod load profile includes comparing harmonics of the measured pushrod load data to harmonics of the modeled pushrod load profile.

2. The system of claim 1 wherein:
comparing the measured pushrod load data to the modeled pushrod load profile includes determining a difference between the measured pushrod load data and the modeled pushrod load profile.

3. The system of claim 1 wherein:
comparing the measured pushrod load data to the modeled pushrod load profile includes determining if the measured pushrod load data is similar to a pushrod fault signature generated by the model.

4. The system of claim 1 wherein:
the harmonics include the $1^{st}$, $2^{nd}$ and/or $n^{th}$ harmonics, for an n-bladed rotor system.

5. The system of claim 1 further comprising:
a results file storing a result of the comparing the measured pushrod load data to the modeled pushrod load profile.

6. The system of claim 5 further comprising:
a transmitter for transmitting the results file to a ground station.

7. A method for monitoring for pushrod faults in an aircraft, the method comprising:
   receiving measured pushrod load data from a wireless sensor mounted on a pushrod;
   executing a model, the model receiving flight data and generating a modeled pushrod load profile; and
   comparing the measured pushrod load data to the modeled pushrod load profile to detect a pushrod fault;
   wherein comparing the measured pushrod load data to the modeled pushrod load profile includes comparing harmonics of the measured pushrod load data to harmonics of the modeled pushrod load profile.

8. The method of claim 7 wherein:
comparing the measured pushrod load data to the modeled pushrod load profile includes determining a difference between the measured pushrod load data and the modeled load profile for a healthy pushrod.

9. The method of claim 7 wherein:
comparing the measured pushrod load data to the modeled pushrod load profile includes determining if the measured pushrod load data is similar to a pushrod fault signature generated by the model.

10. The method of claim 7 wherein:
the harmonics include the $1^{st}$, $2^{nd}$ and $4^{th}$ harmonics.

11. The method of claim 7 further comprising:
storing a result of the comparing the measured pushrod load data to the modeled pushrod load profile in a result file.

12. The system of claim 11 further comprising:
transmitting the results file to a ground station.

* * * * *